W. E. BARNES.
PROCESS AND APPARATUS FOR DRYING POTS.
APPLICATION FILED AUG. 10, 1912.
1,151,555.
Patented Aug. 31, 1915.
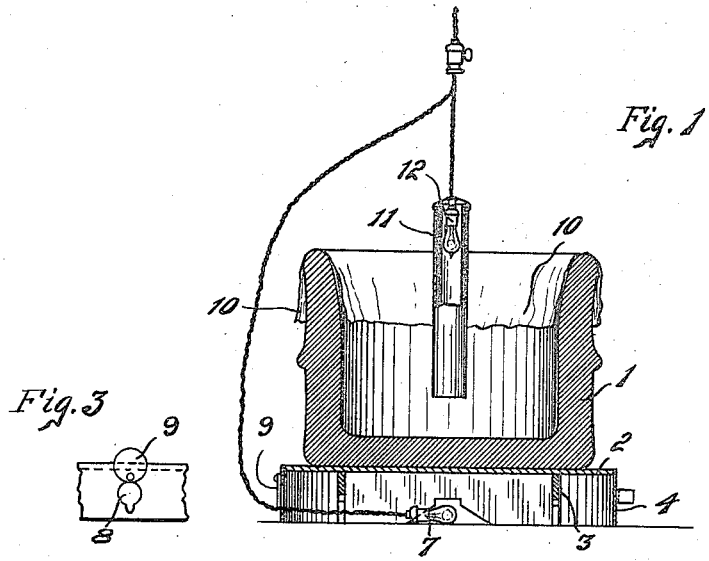
Fig. 1
Fig. 3
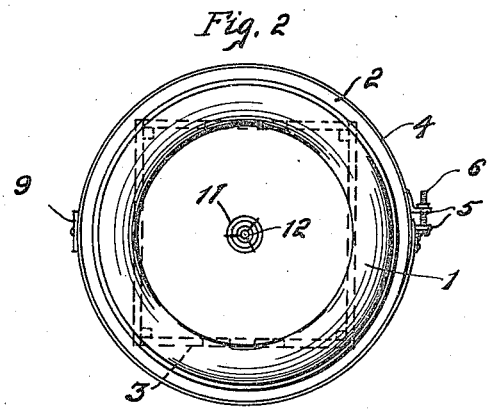
Fig. 2
WITNESSES:
W. E. Barnes  INVENTOR.
BY Paul Synnestvedt
ATTORNEY.

UNITED STATES PATENT OFFICE.

WILLIAM E. BARNES, OF CREIGHTON, PENNSYLVANIA, ASSIGNOR TO PITTSBURGH PLATE GLASS COMPANY, OF PITTSBURGH, PENNSYLVANIA, A CORPORATION OF PENNSYLVANIA.

PROCESS AND APPARATUS FOR DRYING POTS.

1,151,555.   Specification of Letters Patent.   Patented Aug. 31, 1915.

Application filed August 10, 1912. Serial No. 714,433.

*To all whom it may concern:*

Be it known that I, WILLIAM E. BARNES, a citizen of the United States, residing at Creighton, in the county of Allegheny and State of Pennsylvania, have invented certain new and useful Improvements in Processes and Apparatus for Drying Pots, of which the following is a specification.

The invention relates to the art of drying the pots employed in the manufacture of plate glass. These pots are of clay and must be dried very slowly and uniformly in order to avoid strains and cracks in the material. The object of the present invention is to provide a method and apparatus whereby the drying out process may be hastened and whereby the cracking may be eliminated. This is accomplished by the provision of means whereby the drying of those portions of the pots which are ordinarily slowest in drying are hastened and those portions which ordinarily dry out quickest are retarded, thus making the drying process more uniform. The apparatus preferably employed in the carrying out of the process is illustrated in the accompanying drawings, wherein—

Figure 1 is a transverse section through a pot and the apparatus employed, Fig. 2 is a plan view of the apparatus as shown in Fig. 1, and Fig. 3 is a partial side elevation of the side wall beneath the supporting plate.

Referring to the drawings, 1 is the pot of clay which is to be dried; 2 is a supporting plate for the pot, preferably made of iron; 3 is a framework, in the present instance of wood, lying beneath and supporting the plate 2; 4 is the side wall of the chamber beneath the plate 2, such side wall being preferably a sheet metal band bent to the form illustrated and secured at its ends by means of the clips 5 and the threaded rod 6; 7 is a heating element, preferably an incandescent lamp; 8 is a perforation through the member 4, for the insertion of the lamp 7, such passage being covered by the swinging disk 9; 10 is a covering for the upper edge or rim of the pot, such covering being preferably oilcloth or similar material; 11 is a tin tube or flue having an asbestos covering and supported adjacent the center of the interior of the pot, and 12 is a second incandescent lamp for creating an upward draft through the tube.

The bottom and interior of the pot ordinarily dry more slowly than the other portions, while the rim or upper edge of the pot dries more rapidly than the other portions, and it is the purpose of the apparatus above described to secure a more uniform drying by accelerating the drying of the interior and bottom of the pot and retarding the drying of the upper edge of the pot. The slight amount of heat supplied to the plate 2 by means of the incandescent lamp 7 accelerates the drying out of the bottom of the pot, but the arrangement and amount of heat is such that this drying out process at the bottom of the pot is not unduly rapid, and merely keeps pace with the drying out in the other portions of the pot. The lamp 12 in the flue 11 produces an up-draft through such flue, thus causing an inflow of air down the sides of the pot, to take the place of the air drawn out. This flow of air over the interior of the pot accelerates the drying of such portion, the draft as produced by the tube and lamp being of course relatively slight, but just sufficient to make the drying conform with that of the exterior of the pot, at which surface there is naturally a freer natural draft and a more rapid drying. The oilcloth 10 need not be used in all cases, but is of material assistance in holding back the drying out of the upper edge when such drying out seems to be progressing more rapidly than the drying of the other portions of the pot. The foregoing method not only produces a more uniform drying than the process heretofore employed, thus reducing the amount of cracking in the pot, but also reduces the total time necessary to dry the pot.

Having thus described my invention and illustrated its use, what I claim as new and desire to secure by Letters Patent, is the following:

1. A pot drying apparatus comprising a supporting plate beneath the bottom of the pot, an individual inclosed heating element beneath the said plate, a vertically extending flue in the pot, and a heating element in the flue, whereby an upward draft through the flue is secured.

2. The process of drying a pot for use in melting glass, which consists in supporting the pot with its bottom in contact with a heat conducting element substantially coextensive with said bottom, supplying a relatively small amount of heat from a source beneath the said element, and confining the air heated by the source beneath the said element.

In testimony whereof I have hereunto signed my name in the presence of the two subscribed witnesses.

WILLIAM E. BARNES.

Witnesses:
M. L. COCHRAN,
C. S. LAMB.